United States Patent
Goertzel et al.

(10) Patent No.: US 6,532,449 B1
(45) Date of Patent: Mar. 11, 2003

(54) METHOD OF NUMERICAL TIMES SERIES PREDICTION BASED ON NON-NUMERICAL TIME SERIES

(76) Inventors: Ben Goertzel, 161 Canfield Ave., Randolph, NJ (US) 07869; Lisa Pazer, 363 Greenwich Rd., Bedford, NY (US) 10506

( * ) Notice: Subject to any disclaimer, the term of this patent is extended or adjusted under 35 U.S.C. 154(b) by 35 days.

(21) Appl. No.: 09/152,843

(22) Filed: Sep. 14, 1998

(51) Int. Cl.[7] .............................................. G06F 17/60
(52) U.S. Cl. ........................... 705/35; 705/36; 705/37; 705/1; 705/500
(58) Field of Search ............................. 705/37, 35, 36, 705/1, 500

(56) References Cited

U.S. PATENT DOCUMENTS

| | | | |
|---|---|---|---|
| 5,361,201 A | * 11/1994 | Jost et al. .................... | 364/401 |
| 5,560,370 A | * 10/1996 | Verrier et al. ................ | 128/705 |
| 5,761,386 A | * 6/1998 | Lawrence et al. ............ | 706/20 |
| 5,761,442 A | * 6/1998 | Barr et al. .................... | 705/36 |
| 5,946,666 A | * 8/1999 | Nevo et al. ................... | 705/36 |
| 5,953,707 A | * 9/1999 | Huang et al. ................. | 705/10 |
| 5,991,741 A | * 11/1999 | Speakman et al. ............ | 705/30 |
| 6,012,044 A | * 1/2000 | Maggioncalda et al. ...... | 705/36 |
| 6,018,723 A | * 1/2000 | Siegel et al. .................. | 705/38 |
| 6,021,397 A | * 2/2000 | Jones et al. ................... | 705/36 |
| 6,078,901 A | * 6/2000 | Ching .......................... | 705/35 |
| 6,289,321 B1 | * 9/2001 | Suganuma .................... | 705/36 |

FOREIGN PATENT DOCUMENTS

| | | | | |
|---|---|---|---|---|
| JP | 08197872 A | * | 8/1996 | ........... B42D/11/00 |
| JP | 10198646 A | * | 7/1998 | ........... G06F/15/18 |

OTHER PUBLICATIONS

Wuthrich, B et al, "daily Stock market Forecast From textual Web Data", Conference Areticle, SMC '98 Conference Proceedings, 1998 IEEE International Conference on Systems, Man, and Cybernetics (Cat. No. 98CH36218), p. 2720–5 vol. 3 of 5 vol. 4945 pp. 15.*

Shah, I. et al, "Chaotic evolution of a Parameteric Instability in a Piezoelectric Semiconductor Plasma", International Journal of Bifurcation and Chaos inApplied Sciences and Engineering, May 1997, vol. 7, No. 6. p. 1103–13.*

Forrester, J.W., "A National Model For Understanding Social and Economic Change", Simulation, Apr. 1975, vol. 24, p. 125–8.*

* cited by examiner

Primary Examiner—Tariq R. Hafiz
Assistant Examiner—Akiba Robinson-Boyce
(74) Attorney, Agent, or Firm—Joseph E. Levi; Zimmerman & Levi LLP

(57) ABSTRACT

A method for predicting a future value or direction of a first numerical time series comprising the steps of: forming an non-numerical time series; optimizing the non-numerical time series; converting at least a portion of the optimized non-numerical time series into a second numerical time series; and using the second numerical time series to predict the future value of the first numerical time series.

33 Claims, 2 Drawing Sheets

METHOD OF NUMERICAL TIMES SERIES PREDICTION BASED ON NON-NUMERICAL TIME SERIES

BACKGROUND OF INVENTION

The present invention relates to a method for determining a future value of a numerical time series and, in particular, to a method for predicting a future value or direction of a numerical time series based on a non-numerical time series.

Prior art methods exist for predicting a future value or direction of a numerical time series. Generally, these prior art methods apply statistical analysis techniques to the numerical time series data as a basis for predicting future occurrences in the numerical time series. An application of these prior art methods can be found in financial trading systems. Typically, financial trading systems use indicators and predictors for determining a future value or direction of a financial time series, such as the price of a commodity or a market index, and whether the market for the instrument underlying the financial time series should be entered or exited.

An indicator can be a financial time series, for example the historical daily closing prices of the Nasdaq composite, or functions, such as fast stochastic or moving averages that generate a numerical time series. A predictor is a statistical technique, for example simplex prediction, simplex difference prediction, polynomial prediction and fractional prediction, that when applied to a financial time series predict, with a given probability, a future value or direction of the financial time series. Based on a selection of indicators and predictors, the trading system predicts a future value or direction of the financial time series and whether a trade should be made.

Predictive systems are also used to analyze numerical time series to predict a future value or direction in a variety of other contexts as well, such as to project sales, perform climate forecasts (e.g. El Niño) and risk analysis.

Although prior art techniques for predicting a future value or direction of a numerical time series work for their intended purpose, the accuracy of the predictions made using such techniques is necessarily limited to information embedded within the numerical time series and the effectiveness of the statistical techniques used in mining such information. Accordingly, it is desirable to provide a more accurate method of predicting the future value or direction of a numerical time series.

SUMMARY OF THE INVENTION

The present invention is directed to a method for using a non-numerical time series to predict a future value or direction of a numerical time series. In accordance with methods of the present invention, a future value or direction of a first numerical time series is predicted by performing the steps of forming a non-numerical time series; optimizing the non-numerical time series; converting at least a portion of the optimized non-numerical time series into a second numerical time series; and using the second numerical time series to predict the future value of the first numerical time series.

The methods of the present invention are adaptable to predict the future value or direction of a broad range of numerical time series. For example, in one application of the present invention, a text-based time series, such as a series of newspaper articles, is used to predict a future value or direction of a financial time series thereby increasing the profitability of trading the financial instrument underlying the financial time series. Similarly, the methods of the present invention may applied in a variety of contexts including, but not limited to, predicting future sales trends, political trends and reactions and media responses.

Accordingly, it is an object of the present invention to provide a more accurate method for predicting the future value or direction of a numerical or non-numerical time series.

Another object of the present invention is to use a non-numerical time series to predict the future value or direction of a numerical time series or another non-numerical time series.

It is yet another object of the present invention to use a numerical time series to predict the future value of non-numerical time series.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in conjunction with the accompanying drawings, in which.

DETAILED DESCRIPTION OF THE PREFERRED EMBODIMENTS

Figure 1:
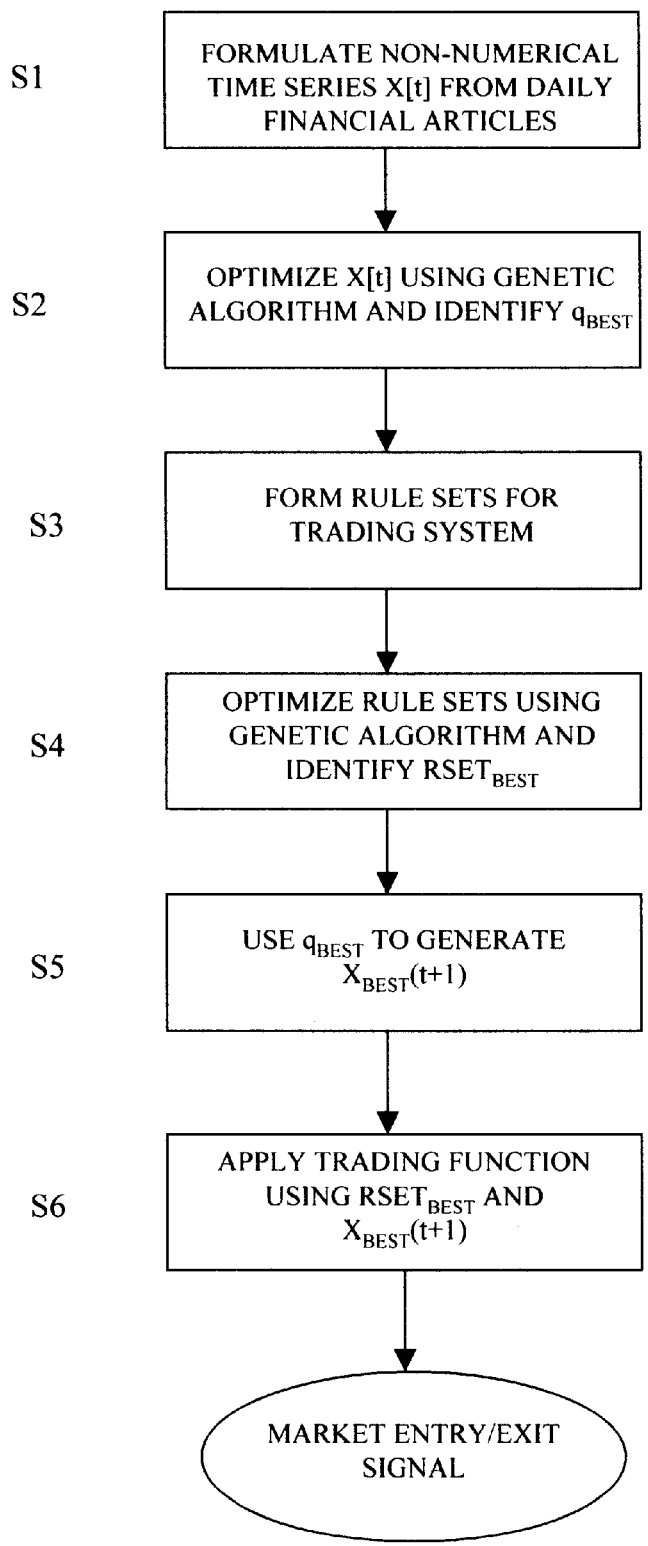
FIG. 1 is a flowchart of the method of the present invention applied to a financial trading system.

Referring now to FIG. 1, there is shown a flowchart of the method of the present invention as applied to a financial trading system. The first step of the method, Step 1, is to formulate a text-based time series, X[t] which in the context of a financial trading system, may consist of financial articles such as articles from the Wall Street Journal or any other source which consistently reports financial information within a short time period of occurrence. The length of X[t], or its training size, is selected to be of sufficient length to provide statistically significant results but not too long so that any statistical significance embedded in X[t] is not averaged (diluted) over time. In an exemplary embodiment, the length of X[t] may be in the range of 6 months to several years. Also, the resolution of time series X[t], and thus the maximum rate at which predictions based on X[t] can be generated, may be varied depending on the nature of text-based time series selected. For example, if the text-based time series consists of the daily Wall Street Journal articles, then the resolution of X[t] is one day. On the other hand, if the text-based time series consists of real-time news source, then X[t] will have a smaller resolution, perhaps one minute.

Once the text-based time series X[t] is selected, X[t] is parsed and all functional words, for example words such as the, and, or, etc., are removed from X[t] because such words provide little predictive value on their own. In an alternative embodiment, the functional words are not removed from X[t] and a parser, such as a link grammar parser (by Sleator and Temperley) is applied to X[t] to disambiguate words and phrases of X[t]. For example, such a parser can distinguish between different uses of a word, for example between a train versus to train.

The next step in the method, Step 2, is to optimize the non-numerical time series X[t] so that any predictive information embedded in X[t] can be identified. Non-numerical time series X[t] may be optimized using any optimization techniques known in the art, including, but not limited to, simulated annealing, conjugate gradients, Newton's method and Monte Carlo method, steepest descent and multi-start.

Figure 2:
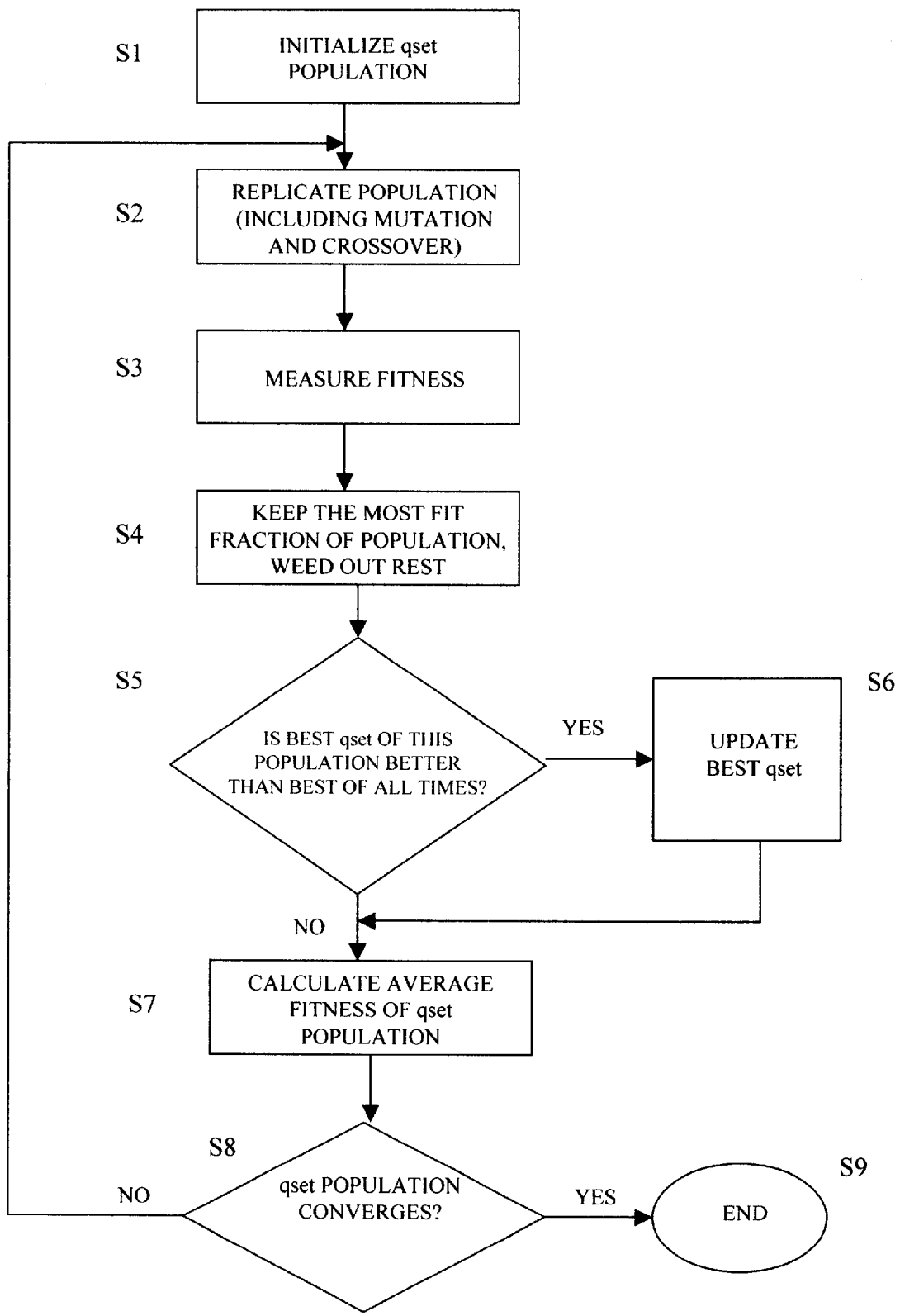
FIG. 2 is a flowchart of a genetic algorithm optimization process according to an exemplary embodiment of the present invention.

Referring now to FIG. 2, there is shown a flowchart showing the optimization of X[t] using a genetic algorithm according to an exemplary embodiment of the present invention. The first step in optimizing X[t] using a genetic algorithm is to form a plurality of qsets based on the text-based time series X[t], as in Step 1. A qset is a number of words selected pseudo-randomly from X[t] and can be of any size, i.e. contain any number of words. In an exemplary embodiment, the qset size will be in the range of one to ten words and will be selected based on how well the text series X[t] correlates with a numerical time series Y[t], the numerical time series for which a prediction of a future value or direction is desired. For example, if X[t] contains Wall Street Journal articles and Y[t] is the historical pricing of the Dow Jones Industrial Average, a qset size of 4 or 5 words may be acceptable because Y[t] and X[t] are likely highly correlated. If, however, Y[t] is widget sales data and X[t] contains articles relating generally to sales, a larger qset may be required if X[t] and Y[t] are not highly correlated.

Although the number of qsets selected from X[t], i.e. the qset population size, can be of any size, in an exemplary embodiment the qset population size is in the range of 100 to 100,000. While it is most preferred to select a number of qsets towards the upper end of this range thereby assuring a highly optimized X[t], the precise number of qsets selected will depend on the size of X[t] and will be limited by the available computer processing power. Also, if the qset population is too small, "inbreeding" of the qsets may result during the genetic algorithm optimization process in which case some qsets may get stuck at local minima and the most optimal qsets may not be identified.

Once the initial population of qsets have been selected, the fitness of the qset population is optimized by recursively applying a genetic algorithm to the qset population. Under the genetic algorithm, an optimizing technique known in the art, (see, for e.g., D. Goldberg, Genetic Algorithms, Optimization and Machine learning, 1989), the qsets in the initial qset population reproduce to form an offspring qset generation. The less fit qsets in the offspring generation are identified based on a selected fitness measurement applied to each qset. The less fit qsets are weeded out from the population so that only the most fit qsets survive.

In particular, the qset offspring generation is derived from the initial qset population by applying the genetic algorithm processes of mutation and crossover to the initial qset population, as in Step 2. In the mutation process, an element is randomly removed from a particular qset and replaced with a randomly selected element from X[t]. The resulting qset is included in the offspring qset population. In the crossover process, two qsets are selected and mated to produce an offspring qset. Although the mating process used may be any mating techniques known in the art, an exemplary mating process includes forming the offspring qset by randomly selecting from the elements of the two parent qsets. For example, if the first parent qset contains Asia, yen, Greenspan, Clinton and ruble, and the second qset parent contains Syquest, Nasdaq, Russia, correction and rebound, then the offspring q-set may contain Asia, Syquest, Nasdaq, Clinton and rebound, or any other permutation of the two parents.

The manner in which the genetic algorithm produces an offspring qset generation may be varied by changing the appropriate genetic algorithm parameters. These parameters control which qsets are selected for mutation and crossover, the mutation rate, whether patricide occurs, the percent of the offspring qset generation that survive, the percent that are reaped based on a particular fitness measurement and the maximum number of generations allowed. The genetic algorithm parameters that will provide optimal results are selected in accordance with the ordinary skill in the art. In an exemplary embodiment, the mutation rate is set to be in the range of 0.1% and 3%, the population size is set to 500, and the maximum number of generations is set to 500.

The next step in evolving the qset population under the genetic algorithm is to determine the fitness of each of the offspring qsets which is used as a basis for reaping out the less fit qsets from the offspring generation, as in Step 3. To determine the fitness of each qset, we first apply a P function to X[t] for all qsets in the qset population so that $$P(X[t], q_i\text{set}) \rightarrow x_i(t) \qquad (1)$$

where i is the population size and $x_i(t)$ is a numerical time series having at each time t a number equal to the times the words in $\text{qset}_i$ appear in the text-based time series X[t]. Next, a fitness function m is applied to $x_i(t)$ and Y[t+k] (where k can be zero or greater; if k=0 it indicates that X[t] includes articles from a morning newspaper published before the market in the security underlying Y[t] opens and Y[t] is that day's closing price in that market and, if k>0, then Y[t+k] is the closing price in that market k days later) yielding a series of numbers $n_i$ for each numerical time series $x_i(t)$ number according to the formula $$m(x_i(t), Y[t+k]) = n_i, -1 \leq n_i \leq 1. \qquad (2)$$

Fitness function m may be any function known in the art that measures the relationship between two numerical time series, such as, for example, Discrete Fourier analysis, dynamic programming string matching, subsequence matching, or wavelets. In an exemplary embodiment, fitness function m is a mean-square correlation of numerical time series of $x_i(t)$ and Y[t]. The number $n_i$ is a measure of the correlation between numerical time series $x_i(t)$ and Y[t]. For example, if n=1 for a particular i, then time series $x_i(t)$ is highly correlated to time series Y[t] i.e. $x_i(t)$ is a positive indicator of the future value or direction of Y[t]. If n=−1 for a particular i, then $x_i(t)$ is highly anti-correlated to time series Y[t], i.e. $x_i(t)$ is a contrary indicator of the future value or direction of Y[t]. If n=0 for a particular i, then there is no correlation between $x_i(t)$ and Y[t].

So, for example, if the application of the P function according to equation (1) yields for a particular $\text{qset}_i$ a numerical time series $x_i(t) = \{7, 8, 0, 15\}$, which represents the number times the words contained in $\text{qset}_i$ appear in X[t] for each time t, then applying the fitness function m according to equation (2) will produce a number, for example 0.3, which indicates the level of correlation between the particular $x_i(t)$ and Y[t].

In an exemplary embodiment, a delta function F is applied to the numerical time series Y[t] to convert the numerical time series data from absolute values to the incremental changes in value of Y[t] for each time t. For example, if the Dow Jones Industrial Average for four previous days is 7980, 7985, 7983 and 7990, applying delta function F would yield a Y[t]={0, +5, −2, +7} which represent the changes in the Dow Jones Industrial Average over the course of the financial time series. The purpose of filtering Y[t] in this manner is so that $x_i(t)$ is correlated to the changes in Y[t], and not to the absolute value of Y[t]. In addition to applying delta function F to Y[t], other functions may be used to precondition numerical time series Y[t] or $x_i[t]$ to reduce "noise" inherent in Y[t] and $x_i[t]$, i.e. data in Y[t] and $x_i[t]$ that does not provide any predictive value or that may dilute the fitness measure of a particular qset.

Thus, fitness function m is applied to $x_i(t)$ for all i thereby producing i fitness measurements, one for each qset in the population. Based on the qset fitness measurements, the least fit members of the qset population are weeded out of the qset population leaving only some portion of the fittest qsets to survive, as in Step 4. As described above, the size of the qset population after reaping is a function of the genetic algorithm parameters which are selected to yield a population size that is sufficiently large to avoid inbreeding and not too large so as to be computationally unwieldy. After reaping, the average fitness of all qsets in the population is calculated, as in Step 7. Also, the qset that is found to be the most fit is saved.

Next, in Step 8, it is determined whether the average fitness of the most recently evolved qset population converges, i.e. the population has ceased to improve substantially. If the qset population fitness did not yet converge, the genetic algorithm optimization process is again applied to the latest qset offspring generation thereby evolving more fit qset populations. After each iteration, it is determined whether the most fit qset of the latest generation is the most fit yet found, as in Step 5, and if so, that qset is saved, as in Step 6. The genetic algorithm optimization process is stopped, as in Step 9, when the average fitness of the most recently evolved qset population converges. At this point, it is likely that the most optimally fit qset, referred to as $q_{best}$, has already been identified. This optimal qset $q_{best}$ is used as a basis for predicting a future value or direction of Y[t]. For example, in context of financial trading systems, the method of the present invention may be used to improve the performance such financial trading systems, as will now be described.

The first step in improving a financial trading system using the present invention is to generate a population of rule sets, rset as in Step 3 of FIG. 1. An rset is a Boolean function that includes one or more indicators $I_j(t)$, a predictor D, threshold values and $x_{best}[t]$ which is generated by applying the P function to X[t] using the best qset, $q_{best}$, as follows:

$$P_{qbest}(X[t]) \rightarrow x_{best}(t).$$

For example, an rset may be as follows: enter LONG iff simplex difference predicts>0.0014% rise (a predictor) AND slow stochastic (FS window size=34, MA window size=11) is less than 50.5 (an indicator) AND $X_{best}[t]$>0.86 (a text indicator compared to threshold), then enter the market in the financial instrument underlying the financial time series Y[t] and exit after one session. The population of rsets are generated by choosing random initial values, using all available indicators $I_j(t)$ and predictor D and $x_{best}(t)$. The rset population size is chosen using the same criteria used in selecting the qset population size—it should be large enough to avoid inbreeding but not too large so as not to be computationally unwieldy. In an exemplary embodiment, the initial rset population size is 100.

Once the initial rset population is formed, a genetic algorithm, similar to the genetic algorithm described above with respect to qset optimization, is applied to optimize the initial rset population. The fitness of each rset is measured by applying a fitness function $$E_{rset}(D, I_j(t), x_{best}(t)) \tag{3}$$

for each rset in the population which measures the performance of the trading system. The fitness measure used may be any measure by which the performance of the trading system is evaluated, such as, for example, profits or profits/maximum loss. The fitness of a particular rset as measured by $E_{rset}$ is determined by selecting a training period consisting of financial time series data selected from Y[t] and performing a trade in the financial instrument underlying financial time series Y[t] for each time t based on the parameters D, $I_j(t)$ and $x_{best}(t)$ of the particular rset. The profitability (if that is the selected fitness measure) of all the trades performed by the rset over the training period is calculated and used as the fitness of the rset. This process is repeated for all rsets in the population resulting in a fitness measure for each rset.

After the fitness of the initial rset population is determined, the genetic algorithm is repeatedly applied to evolve the rset population to identify the optimal rule set rsetbest, as in Step 4. This optimal rset $rset_{best}$ represents the optimal trading rule set based on indicators $I_j(t)$, predictor D and $x_{best}(t)$.

Optimal rset $rset_{best}$ and $qset_{best}$, which embodies predictive information gleaned from text series X[t], are used to produce a signal to either enter or exit the market for the financial instrument that underlies Y[t] in the following manner. First, by applying the P function of equation (1), as in Step 5, it is determined the number of times the words contained in $qset_{best}$ appears in a newly-released text series information, X[t+1], for example today's Wall Street Journal articles published prior to the opening of the market of the financial instrument that underlies Y[t]. This generates a numerical time series $X_{best}(t+1)$ as follows:

$$P_{qbest}(X(t+1)) \rightarrow x_{best}(t+1).$$

Then we apply a trading function $$T_{rbest}(x_{best}(t+1))$$

which uses the best rule set $rset_{best}$ to produce a market enter/exit signal based on $x_{best}(t+1))$, the number of times the words contained in $q_{best}$ appear in the newly released articles, as in Step 6. As a result, the predictive information embedded in the text-based time series X[t] is used to predict a future value or direction of the financial time series Y[t] thereby improving the ability of the trading system to time a market entry/exit.

Applying the methods of the present invention to a financial trading system yielded a significant increase in trading profits. To measure the benefits provided by the invention, a prior art trading system was used to generate trades in U.S Yen futures over a particular time range. Of the 61 trades made by the system, 36 were profitable and 25 were unprofitable. Then, the trading system was modified to include the method of present invention and was used to generate trades in the U.S. Yen futures over the same time range. Of the 12 trades made by the system, 10 were profitable and 2 were not. This indicates that although the improved trading system invention generated a lesser number of profitable trades, the trading system avoided a significant number of unprofitable trades that were made by prior art trading system. Thus, the profitability of trades made by a trading system incorporating the methods of the present invention was significantly higher than trades made by the prior art trading system alone.

Although the methods of the present invention were described in the context of using a text-based time series to predict a future value or direction of a financial time series to time market entry/exit points, it will be obvious to one of ordinary skill in the art that the present invention may be used to predict the future value and direction of other numerical and non-numerical time series. For example, a text-based time series consisting of trade articles relating to a particular market may be used to predict future sales of a product in that market.

Also, according to the methods of the present invention, a first text-based time series X1[t] can be used to predict the occurrence of a word, words or phrase in a second text-based time series X2[t]. In this case, a qset q is selected from X1[t] and includes the words or phrases that one desires to predict in X2[t]. A numeric series $x_1[t]$ is then formed by applying $$P(X1[t], q) \rightarrow x_1[t].$$

Next, a qset population is formed based on text-based time series X2[t] and a series of numerical time series $x_{2i}[t]$ is formed by $$P(X2[t], q_{iset}) \rightarrow x_{2i}[t]$$

as described above. Then, the fitness of the qset population based on X2[t] is measured by $$m(x_{2i}[t], x_1[t]).$$

In an alternative embodiment, two qset populations Q1 and Q2 are formed from text-based time series X1[t] and X2[t], respectively. Then, a genetic algorithm is applied to each of qset populations Q1 and Q1 independently. For each qset in each qset population Q1, Q2, a time series is generated as follows:

$$P(X1[t], Q_i1) \rightarrow x_{1i}[t]$$

$$P(X2[t], Q_{i2}) \rightarrow x_{1i}[t].$$

Then, pairs of qsets are formed by selecting one qset from each qset population Q1 and Q2, and the fitness (correlation) of the qset pairs is measured by $$m(x_{1i}[t], x_{2i}[t]).$$

In addition, the methods of the present invention can be used to predict the future occurrence of a word, words or phrase in a text-based time series based X[t] on a numerical timer series Y[t]. This approach is identical to that one used to predict a numerical time series based on a text-based timer series, described above, the only difference being that the m function is applied as follows:

$$m(Y[t], x_i[t+k]).$$

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer implemented method for predicting a future value or direction of a first time series, said first time series representing a plurality of values associated with a financial instrument, comprising the steps of:

forming a non-numerical time series;

optimizing said non-numerical time series;

converting at least a portion of said optimized non-numerical time series into a second numerical time series;

using said second numerical time series to predict the future value or direction of said first time series; and using said computer to execute a transaction in said financial instrument based on the future value or direction of said first time series.

2. The method of claim 1, wherein the non-numerical time series is comprised of non-numerical information for a plurality of times.

3. The method of claim 2, wherein the plurality of times has a first time and a last time and the difference between said last time and said first time is in the range of six months to two years.

4. The method of claim 1, wherein each of the plurality of times is a day.

5. The method of claim 1, wherein each of the plurality of times is an hour.

6. The method of claim 1, wherein the step of forming a non-numerical time series further comprises the step of:

parsing said non-numerical information of said non-numerical time series.

7. The method of claim 6, wherein the step of parsing further comprises the step of:

removing functional words from said non-numerical information.

8. The method of claim 1, wherein the step of forming a non-numerical time series includes the step of:

disambiguating said non-numerical information of said non-numerical time series.

9. The method of claim 8, wherein the step of disambiguating include the step of:

applying a link grammar parser to said non-numerical time series.

10. The method of claim 1, wherein the step of optimizing said non-numerical time series further comprises the steps of:

a) forming a plurality of qsets based on said non-numerical time series;

b) applying an optimizing technique to said plurality of qsets to form an offspring generation of qsets, each of said offspring generation of qsets having a fitness measure;

c) measuring the fitness measure of each of said offspring generation of qests;

d) weeding out of said offspring generation qsets having a fitness measure being less than a selected fitness measurement;

e) saving the one of said offspring generation of qsets having the best fitness measure;

f) calculating an average fitness for said offspring of qsets;

g) recursively applying steps (b) - (f) until said offspring generation of qsets converge; and (h) outputting the one of said offspring generation of qsets having the best fitness measure.

11. The method of claim 10, wherein the optimizing technique is selected from the group of simulated annealing, conjugate gradients, Newton's method, Monte Carlo method, steepest descent and multi-start.

12. The method of claim 10, wherein the optimizing technique is a genetic algorithm.

13. The method of claim 10, wherein said non-numerical series is comprised of non-numerical information for a plurality of times and each of said plurality of qsets includes at least one word from said non-numerical time series.

14. The method of claim 13, wherein said genetic algorithm comprises the steps of:
 replacing a word randomly selected from at least one of said plurality of qsets with at least one word randomly selected from said non-numerical time series; and
 mating a pair of randomly selected qsets.

15. The method of claim 13, wherein each of said plurality of qsets includes a number of words in the range of 1 to 15.

16. The method of claim 10, wherein the number of qests formed is in the range of 100 to 100,000.

17. The method of claim 13, wherein the measuring step comprises the steps of:
 determining the number of times said words from each of said plurality of qsets occur in said non-numerical time series for each time t;
 forming a plurality of numerical time series, each of said plurality of numerical time series comprising the number of times said words from one of said plurality of qsets occur in said non-numerical time series for each time t;
 using a fitness function to determine the relationship between each of said plurality of numerical time series and said first time series; and
 generating a fitness measure for each of said plurality of numerical time series associated with one of said plurality of qsets.

18. The method of claim 17, wherein the fitness function is selected from the group of discrete Fourier analysis, dynamic programming string matching, subsequence matching and wavelets.

19. The method of claim 17, wherein the fitness function is mean-square correlation.

20. The method of claim 10, wherein the step of converting at least a portion of said optimized non-numerical time series includes the step of:
 forming said second numerical time series from the number of times said words from said qset of said offspring generation of qsets having the best fitness measure occur in said non-numerical time series for each time t.

21. The method of claim 1, further comprising the step of: applying a filtering function to said first time series.

22. The method of claim 21, wherein said filtering function is a delta function.

23. The method of claim 17, wherein the step of using said second numerical time series to predict the future value of said first time series further comprises the steps of:
 (a) forming a plurality of rule sets;
 (b) applying an optimizing technique to said plurality of rule sets to form an offspring generation of rule sets, each of said offspring generation of rule sets having a fitness measure;
 (c) measuring the fitness measure of each of said offspring generation of rule sets;
 (d) weeding out each of said offspring generation of rule sets having a fitness measure being less than a selected fitness measurement;
 (e) saving the one of said offspring generation of rule sets having the best fitness measure;
 (f) calculating an average fitness for said offspring generation of rule sets;
 (g) recursively applying steps (b)–(f) until said offspring generation of rule sets converge; and
 (h) outputting the one of said offspring generation of rule sets having the best fitness measure.

24. The method of claim 23, wherein the optimizing technique is selected from the group of simulated annealing, conjugate gradients, Newton's method, Monte Carlo method, steepest descent and multi-start.

25. The method of claim 23, wherein the optimizing technique is a genetic algorithm.

26. The method of claim 23, wherein each of said plurality of rule sets includes at least one of an indicator and a predictor and the one of said plurality of numerical time series associated with the one of said offspring generation of qsets having the best fitness measure.

27. The method of claim 23, wherein the number of rule sets formed is in the range of 100 to 100,000.

28. The method of claim 23, wherein the measuring step comprises the steps of:
 performing a trade in said first time series by applying each of said plurality of rule sets to said first time series;
 determining a fitness measure for each of said plurality of rule sets.

29. The method of claim 28, wherein the fitness measure is the measure of profitability resulting from said trade in said time series using each of said plurality of rule sets.

30. The method of claim 28, wherein the fitness measure is the measure of profits/maximum loss resulting from said trade in said time series using each of said plurality of rule sets.

31. The method of claim 23, further comprising the steps of:
 determining the number of times said words from said qset having the best fitness measure occur in said non-numerical time series for time t+1; and
 applying said rule set having the best fitness measure using the number of times said words from said qset having the best fitness measure occur in said non-numerical time series for time t+1 to predict the future value of said first time series.

32. The method of claim 1, wherein the non-numerical time series includes financially-related information.

33. An improved computer implemented method for trading a financial instrument, comprising the steps of:
 forming a financially-related non-numerical time series;
 optimizing said financially-related non-numerical time series;
 converting at least a portion of said financially-related non-numerical time series into an optimized numerical time series;
 forming a plurality of rule sets;
 optimizing said plurality of rule sets using said optimized numerical time series;
 selecting a best rule set from said plurality of rule sets;
 using said best rule set to predict a future value of said financial instrument; and
 using said computer to execute a transaction in said financial instrument based on said future value.

* * * * *